United States Patent
McQuilkin

(10) Patent No.: US 9,632,952 B1
(45) Date of Patent: Apr. 25, 2017

(54) INTERMEDIATE COMPUTER INTERFACE DEVICE

(71) Applicant: Adam James McQuilkin, Hollis, NH (US)

(72) Inventor: Adam James McQuilkin, Hollis, NH (US)

( * ) Notice: Subject to any disclaimer, the term of this patent is extended or adjusted under 35 U.S.C. 154(b) by 0 days.

(21) Appl. No.: 14/943,455

(22) Filed: Nov. 17, 2015

(51) Int. Cl.
*G06F 13/10* (2006.01)
*G06F 13/20* (2006.01)
*G06F 13/40* (2006.01)
*G06F 13/42* (2006.01)
*G06F 13/38* (2006.01)

(52) U.S. Cl.
CPC .......... *G06F 13/102* (2013.01); *G06F 13/20* (2013.01); *G06F 13/409* (2013.01); *G06F 13/4068* (2013.01); *G06F 13/4282* (2013.01)

(58) Field of Classification Search
None
See application file for complete search history.

(56) References Cited

U.S. PATENT DOCUMENTS

2007/0247430 A1* 10/2007 Huang .................... G06F 3/038
345/168
2015/0356045 A1* 12/2015 Soffer ................. G06F 13/4221
710/303

* cited by examiner

*Primary Examiner* — Scott Sun

(57) ABSTRACT

This application discloses an innovation which improves the flexibility and utility of a computer mouse by including interposing hardware into a computer/HID system providing hardware configurability and modification of mouse event data frames in real time to produce novel mouse events.

7 Claims, 4 Drawing Sheets

Intermediate Computer Interface Device Embodiment

*Host / HID System
Block Diagram*

System Block Diagram

Intermediate Computer Interface Device (ICID) Block Diagram

*Intermediate Computer Interface Device Embodiment*

INTERMEDIATE COMPUTER INTERFACE DEVICE

The present invention is in the field of electronics, more particularly in the technical field of electrical computers and digital processing systems.

BACKGROUND OF THE INVENTION

The ubiquity of the Personal Computer (PC) and their associated human interface devices (HID) is familiar to nearly everyone. The most common HID, the computer mouse, takes many forms from the single button to multi-button types to joysticks or rollerballs all which serve the similar purpose of translating a human motion into a computer understandable event. A mouse event is defined here as any human to mouse interaction which results in an electrical signal being passed from the mouse to the host computer. Examples of mouse events include but are not limited to a mouse button click and release, a mouse button click and hold, a scroll wheel click, or a scroll wheel click and hold. It is important to note the terms "mouse" and "HID" are used interchangeably in the remainder of this disclosure are intended to represent any generalized hand operated computer HID.

Communication between the mouse and its host is dictated by convention, formalized by industry standards and protocols. Industry standards establish a common language and set of rules to which a computer peripheral must adhere to guarantee proper operation. Examples of mouse protocols are the legacy PS2 synchronous protocol and the more recent HID USB device class protocols. These protocols define and establish conventions for the fundamental building blocks of serial commination which are serial data frames and packets.

An elemental purpose of the mouse protocol is to force consistency and predictability in the frames and packets sent by a mouse to a host in response to mouse events. As such the protocols must include a mouse event to data frame "mapping" which manifests as a unique frame or packet for each possible mouse event. This mapping ensures that, for example, a left button mouse click is interpreted as a left mouse click by a compatible host. Each mouse HID input (button, trigger, knob, etc.) has an associated unique event signature in the form of a unique data frame or packet.

The explosion in PC popularity has been closely mirrored by the popularity of computer gaming. Some games are written to accommodate the use of specialty, enthusiast gaming HIDs which greatly increase the number of potential unique event signatures by including more HID inputs. The vast majority of computer games, though, are controlled with the far more common two or three button type mouse. As such the number of HID inputs and thus unique event signatures available are necessarily limited. The innovation disclosed here serves to increase the number of unique event signatures and mouse events patterns by manipulating mouse events to produce novel mouse events. This manipulation occurs by the way of intermediate hardware inserted between a computer mouse and a host computer.

In its most rudimentary embodiment this intermediate hardware takes the form of a USB host emulator used to accept mouse write frames, followed by control electronics to manipulate or duplicate the mouse frames to produce novel mouse events in a manner dictated by additional hardware inputs (switches, knobs, buttons, etc.), followed by a USB slave emulator to write the novel mouse events to the host computer. This innovation will heretofore be referenced by the acronym ICID (Intermediate Computer Interface Device).

The ICID increases the number of possible unique event signatures by allowing mouse HIDs to perform multiple functions depending on the state of the ICID additional hardware inputs. For example a mouse click and hold can produce different frame data and thus different host outcome depending on the state of an ICID mechanical input.

A potential ICID benefit is to circumvent human physiological limitations of computer game play. Humans are not physically capable of clicking a mouse button 200 times a second which represents the maximum allowable rate per the USB HID class protocol. It is easy to recognize the utility of passing the game player's burden of creating rapid, repeating mouse events over to ICID hardware. The ICID can map a single mouse event into novel mouse events for instance, a repeating pattern of mouse events whose frequency and duration is dictated by the ICID additional hardware inputs.

An example ICID embodiment is a small box interposed between a PC and a mouse via USB cables having two HID inputs allocated for each mouse button (for a total of 6 HID inputs) where one input defines mouse event mapping and the other the move event repeat frequency.

SUMMARY OF THE INVENTION

This application discloses an innovation which improves the flexibility and utility of a computer mouse by including interposing hardware into a computer/HID system providing hardware configurability and modification of mouse event data frames in real time to produce novel mouse events.

BRIEF DESCRIPTIONS OF THE DRAWINGS

DETAILED DESCRIPTION OF THE INVENTION

Figure 1:
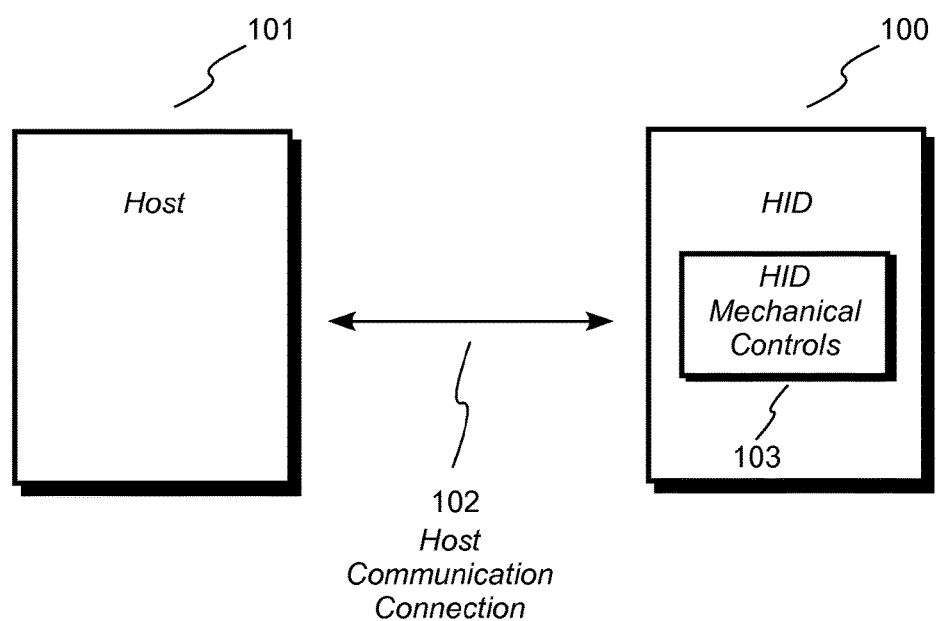
FIG. 1 depicts an exemplary prior art block diagram of a host/HID system. For example the host could take the form of a Personal Computer and the HID could take the form of a computer mouse.

FIG. 1 depicts an exemplary prior art block diagram of a host/HID system where the host 101 could take the form of a PC and the HID 100 could take the form of a three button computer mouse. The communication connection 102 could take the form of a USB cable or a wireless USB connection. HID inputs 103 represent an arbitrary number of human interface device inputs and in the case of a computer mouse 100, 103 represents an arbitrary number of mouse buttons.

A major deficiency of this system is the frequency and duration of mouse click events is constrained by human physiological limitations.

Figure 2:
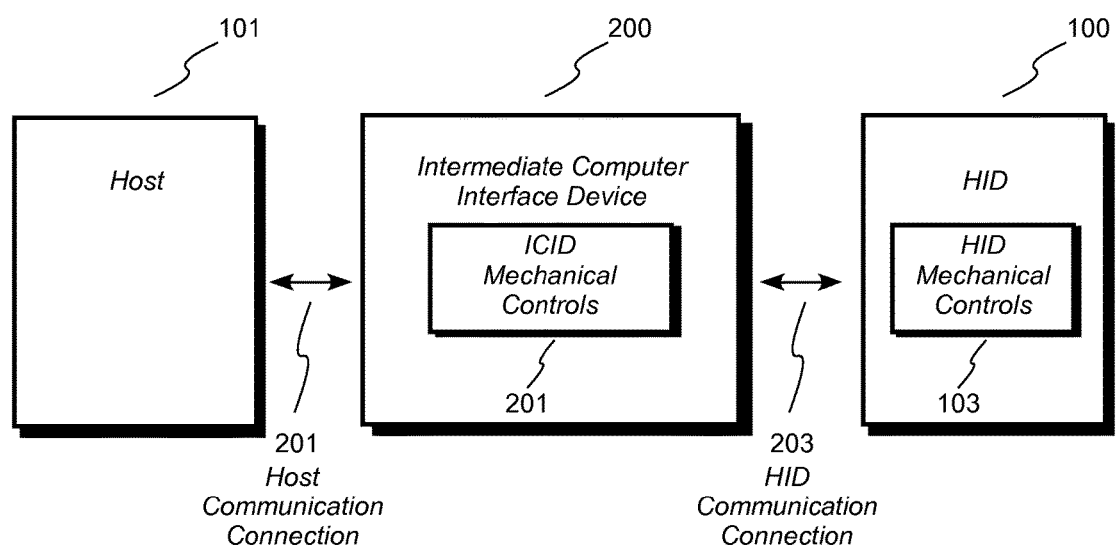
FIG. 2 depicts an exemplary block diagram of a host/ICID/HID system. For example the ICID could take the form of an interposing piece of hardware with HID additional inputs.

FIG. 2 depicts an exemplary block diagram of a host/ICID/HID system. FIG. 2 differs from FIG. 1 in that an Intermediate Computer Interface Device hardware circuit 200 has been added between the host 101 and the mouse 100. The ICID 200 is meant to intercept mouse 100 write signal event frames, manipulate or replace the frames using control electronics in a manner dictated by the ICID mechanical controls 201 (switches, knobs, buttons, etc.) to produce novel mouse events, and finally write novel mouse event data frames to the host computer 101. The ICID hardware 200 improves the flexibility and utility of the computer mouse 100 by providing hardware configurability and modification of mouse event data frames in real time.

Figure 3:
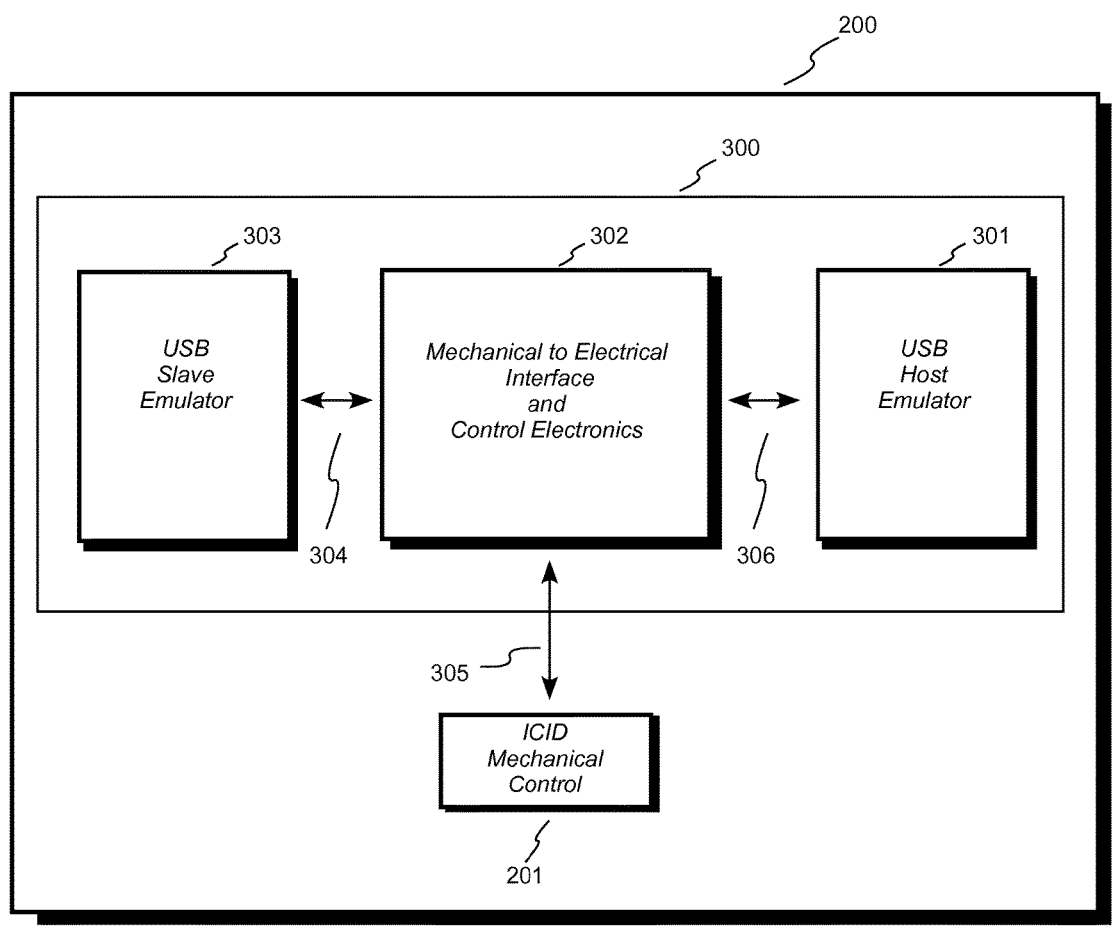
FIG. 3 depicts an exemplary block diagram of a generalized ICID embodiment including ICID mechanical controls. The ICID could take the form of a microcontroller with USB "on the go" compatibility interfacing with mechanical controls (switches, buttons, knobs, etc.) used to remap and manipulate mouse event data frames to produce novel mouse events.

FIG. 3 depicts an exemplary block diagram of the ICID 200. The ICID 200 input consists of a USB host emulator 301 which receives mouse event frames. The frames are then passed to the control electronics block 302 which modifies the mouse frames in response to ICID mechanical controls 201 to produce novel mouse events. The novel mouse event data frames are then sent to a USB slave emulator 303 which passes them to the host computer 101. The collection of 301, 302 and 303 functions could be embodied as a microcontroller 300 which is USB "on the go" compatible, programmed in a way to modify or duplicate mouse event frames in response to ICID mechanical controls 201 to produce novel mouse events. The mechanical controls 201 interface with the microcontroller 305 could take the form of potentiometers or optical encoders communicating with the microcontroller's 300 GPIO inputs.

Figure 4:
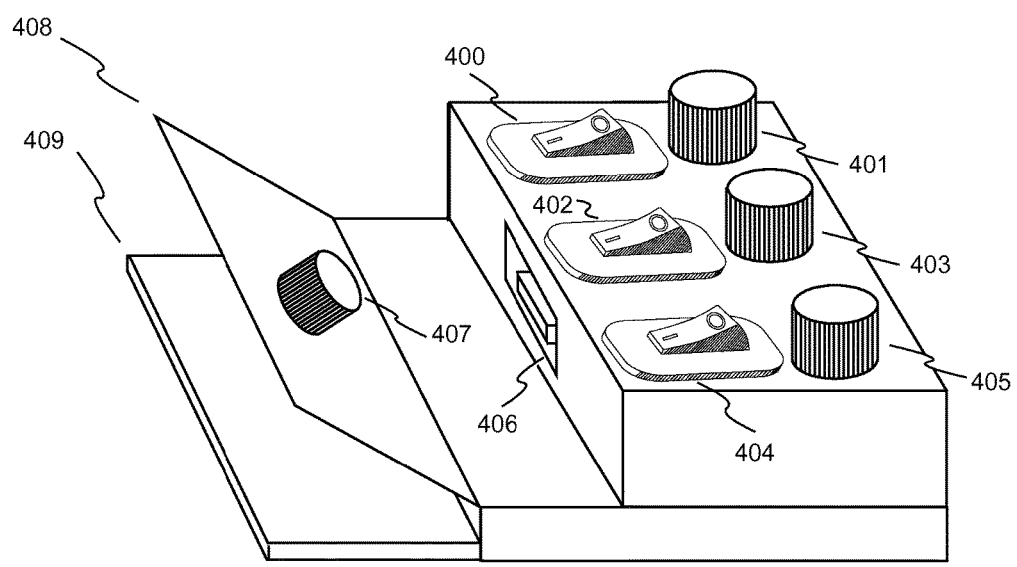
FIG. 4 depicts an exemplary ICID embodiment having a rocker switch and a knob to remap and control for each of the three buttons of a three button mouse.

FIG. 4 depicts an exemplary ICID embodiment having rocker switches 400, 402, 403 and knobs 401, 403, 405 to redefine and control each of the left, middle and right mouse buttons of a three button mouse respectively. One of a possible plurality of USB inputs or outputs, depicted by 406, serve to connect the ICID to a mouse 100 and also to a host computer 101. Also embodied as 407, 408, 409 is an apparatus used to secure the ICID to an object like a keyboard or a desk so as to avoid moving the ICID when operating the ICID inputs 401-405.

To operate the ICID 200 it must first be connected to a computer mouse 100 and a host computer 101 using either USB cables or wireless USB adapters connecting to its USB ports represented by 406. The user then secures the ICID to a keyboard by placing clamping structures 408, 409 over the keyboard's edge and tightening clamping knob 407 thus making the ICID immovable when operating controls 401-405. The switches 400, 402, 404 are then placed in their default positions which causes the mouse 100 to behave conventionally as any standard three button mouse and thus mouse performance is unresponsive to user inputs via knobs 401, 403, 405.

During the course of game play assume the user wants to change the behavior of a left button click and hold event from the conventional mouse behavior to a new behavior. The user can then engage the mechanical controls rocker switch 400 from its default position to a new position which instructs the ICID control electronics to remap a left button click and hold to a succession of mouse events whose frequency is determined by the mechanical control's knob 401 position and whose duration is determined by the length of the click and hold event. In this way, the functionality and utility of a standard mouse can be greatly increased with the addition of ICID hardware which enables remapping of standard mouse events into novel mouse events.

I claim:

1. An apparatus for modifying computer mouse commands comprising:
    a USB input connector configured to connect to a computer mouse;
    a USB host emulator structure coupled to the USB input connector configured to communicate with the computer mouse;
    a control electronics structure coupled to the USB host emulator structure;
    a mechanical controls structure coupled to the control electronics structure;
    wherein the control electronics operate on mouse events to produce modified mouse events based on the position of the mechanical controls;
    wherein the production of modified mouse events is performed in real time in response to user input to the mouse;
    wherein the mechanical controls are comprised of knobs and switches;
    wherein the knobs modify at least the frequency of the mouse events;
    a USB slave emulator structure coupled to the control electronics structure configured to communicate with a host computer;
    a USB output connector configured to connect to the host computer; and
    a housing to couple to the USB input connector, the mechanical controls and the USB output connector.

2. The system of claim 1, wherein a state of the mechanical controls compel the control electronics to produce the modified mouse events to be identical to the mouse events.

3. The system of claim 1, wherein a state of the mechanical controls compel the control electronics to produce the modified mouse events as a repeating occurrence of the mouse event.

4. The system of claim 1, wherein the mechanical controls are comprised of a knob and a switch applying to only one button of the computer mouse.

5. The system of claim 1, wherein the housing is coupled to a clamping mechanism.

6. The system of claim 5, wherein the clamping mechanism can be connected to an object to prevent movement of the housing when a person uses the mechanical controls.

7. A method for modifying computer mouse events comprising:
    connecting a computer mouse to a USB input connector;
    communicating with the computer mouse using a USB host emulator;
    coupling the USB host emulator to a control electronics structure containing mechanical controls;
    wherein the mechanical controls are comprised of knobs and switches;
    wherein the knobs modify at least the frequency of the mouse events;
    operating on mouse events to produce modified mouse events based on the position of the mechanical controls wherein the production of the modified mouse events is performed in real time in response to user input on the mouse;
    communicating with a host computer using a USB slave emulator structure; and
    connecting the USB slave emulator structure to the host computer.

\* \* \* \* \*